Jan. 30, 1968 B. L. CROWDER ET AL 3,366,819

LIGHT EMITTING SEMICONDUCTOR DEVICE

Filed Feb. 14, 1966

INVENTORS
BILLY L. CROWDER
FREDERICK F. MOREHEAD
PETER R. WAGNER

BY John E Dougherty Jr.
ATTORNEY

United States Patent Office 3,366,819
Patented Jan. 30, 1968

3,366,819

LIGHT EMITTING SEMICONDUCTOR DEVICE

Billy L. Crowder, Suffern, Frederick F. Morehead, Yorktown Heights, and Peter R. Wagner, Croton-on-Hudson, N.Y., assignors to International Business Machines Corporation, Armonk, N.Y., a corporation of New York Filed Feb. 14, 1966, Ser. No. 527,015
11 Claims. (Cl. 313—108)

ABSTRACT OF THE DISCLOSURE

The electroluminescent semiconductor device is formed of a body of zinc telluride, which is a II–VI compound that can be made p conductivity type, but cannot be rendered n conductivity type with known processes. Originally the entire body is prepared to include a relatively higher concentration of lithium to render it p type. Aluminium, an n type impurity, is diffused through one surface of the device to form at that surface an insulating region. This insulating region has a number of portions, a first one of which extends to the surface and a second one of which is electroluminescent. This second portion is separated from the surface by the first portion of the insulating region. One electrode is connected to this surface and another electrode to a surface of the lithium doped region of the device. When a voltage exceeding a threshold voltage is applied, light emission is produced in a visible portion of the spectrum. It is believed that the mechanism which is most likely to be responsible for the operation of the device is an avalanching mechanism. In any event a sustained light emission is produced which can be maintained with a lower applied voltage once initiated by a voltage above threshold. When maintained at this lower voltage, the light emission can also be triggered by applying a light pulse to the second insulating region of the device.

The present invention relates to semiconductor devices and more particularly to improved devices which produce light outputs in the visible portion of the electromagnetic spectrum.

There has been in recent years a continuing and increasing emphasis in both research and development on devices which emit light. Lasers which are devices that emit light outputs which are highly monochromatic, directional and coherent have of course received much attention but there are many commercial applications that do not necessarily require light outputs of this type. More specifically, in applications such as electronically addressable displays and non contact light controlled printing, light emitting devices may be operated in a non lasing mode, and in some cases this mode of operation is preferrable. Though light emitting devices such as neon and xenon tubes have been available for some time the present day demands are for small high speed elements which are compatible with the electronic circuitry presently being developed. Though electroluminescent diodes have been developed, there is still the need for a device of this type which can efficiently produce light outputs in the visible portion of the electromagnetic spectrum.

The II–VI compounds have been considered as one class of materials whose characteristics lend themselves to this type of application since the band gaps of these materials correspond to energies associated with light emission in the visible portion of the electromagnetic spectrum. However, these materials can be prepared usually as only single conductivity type materials in which p-n junctions cannot be established without great difficulty, if at all. As a result conventional p-n junction type electroluminescent diodes have not been successfully fabricated with these semiconductor compounds. Another mechanism which has been successfully employed to produce light emission, electroluminescent as well as lasing, is avalanche breakdown. For example, avalanche breakdown diodes which provide light outputs in the infrared region have been fabricated from gallium arsenide diodes which are doped to be single conductivity type and include one or more regions of high resistivity in which avalanching is produced and it has been suggested that this type of mechanism may be employed in II–VI compounds to produce visible light outputs. Pertinent prior art describing in more detail work of this type described above is listed below.

(a) Patent application, Ser. No. 476,271, filed Aug. 2, 1965 in behalf of R. E. Fern and K. Weiser and assigned to the assignee of the subject application.

(b) An article entitled, "Injection Luminescence in ZnTe Diodes," which appeared in the Japanese Journal of Applied Physics, 3(1964), pp. 427–428.

(c) An article entitled, "Injection Electroluminescence in P type ZnTe," which appeared in Physics Letters, vol. 11, No. 3, August 1964, pp. 202–203.

(d) An article entitled, "Injection Electroluminescence in Metal-Semiconductor Tunnel Diodes," which appeared in Solid State Electronics, vol. 7, 1964, pp. 879–885.

In accordance with the principles of the present invention improved light emitting devices are provided which are capable of producing light outputs in the visible portion of the electromagnetic spectrum at room temperature as well as at lower temperatures. More specifically, the preferred embodiment of the invention disclosed herein by way of example, uses a crystal of zinc telluride. This material which is a II–VI compound can usually be prepared to be only p type since the material exhibits an internal mechanism for compensating the effects of n type impurities. The original crystal from which the device is fabricated is grown to be p type, the preferred impurity used being lithium which is a shallow level acceptor in zince telluride. An n type impurity, preferably aluminium, is then diffused through one surface of the zinc telluride crystal. Lithium diffuses faster in zinc telluride than does aluminium, and further lithium has a higher solubility in the portion of the crystal in which the aluminium is diffused than in the other portion of the crystal. These diffusion rates allow the production of a narrow compensated region which is insulating. One feature of the invention which is illustrated in this embodiment is the formation of this narrow insulating region right at the surface of the crystalline body. This region adjoins a region in the body which remains primarily p type. An electrode is applied to the insulating surface to form thereat an M-I-P structure and another electrode is applied to connect to the p type region. The application of a voltage to these electrodes, preferably a forward bias voltage, produces avalanche breakdown in the insulating region and subsequent electron hole recombination to provide a visible light output.

By controlling the method of preparing the crystalline devices, and specifically the time, temperature and overpressures used in diffusing the second impurity into the originally prepared single conductivity crystal substrate the effective width of the insulating region can be controlled and devices capable of operation at both room temperature and lower temperatures can be realized. The light output of the resulting device can also be varied by varying the method of preparation. It is also possible to eliminate or at least minimize losses in the structure, which are particularly troublesome in devices prepared for room temperature operation, by preparing the original substrate to include a second impurity of the same type which is less mobile during the diffusion operation.

For example p type impurity phosphorous may be included in the original lithium doped substrate for this purpose.

Therefore it is an object of the present invention to provide improved light emitting devices as well as methods of making such devices.

A further object is to provide efficient electroluminescent avalanche breakdown diodes which emit light in the visible portion of the electromagnetic spectrum.

A further object is to provide electroluminescent diodes of this type, as well as a method of preparing such diodes, which can be operated at different temperatures with reasonable sustaining voltages.

Still another object is to provide an improved avalanche breakdown diode in which the insulating region in which the avalanche breakdown is produced is a narrow region at one surface of the diode and that surface is itself insulating.

Another object is to provide structures and methods of fabrication which allow use of self compensating type materials such as the II–VI components in semiconductor applications which advantageously employ the inherent physical characteristics of these materials.

The foregoing and other objects, features and advantages of the invention will be apparent from the following more particular description of preferred embodiments of the invention as illustrated in the accompanying drawings.

Figure 1:
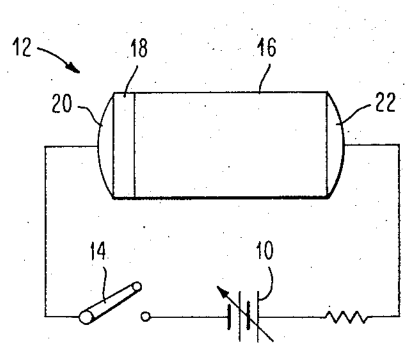
FIGS. 1 and 2 are schematic circuit diagrams including electroluminescent diodes embodying the present invention.

The circuit of FIG. 1 includes a voltage source represented by a battery 10 which applies forward bias voltage signals to an electroluminescent diode generally designated 12 under control of a switch 14. Device 12 is formed of a crystalline body of zinc telluride and includes a p region 16 and a compensated region 18 which is insulating. The p region 16 makes up a greater portion of the semiconductor body and the insulating region 18 is a very thin region formed at the surfaces of the device. The device is provided with a pair of electrodes 20 and 22 to which the voltage signals are applied.

Figure 3:
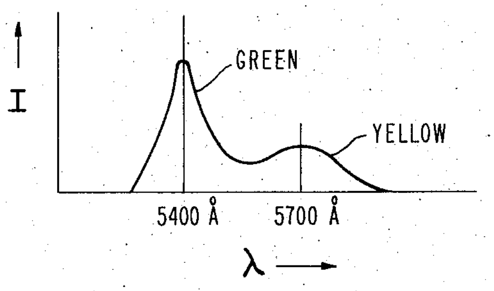
FIG. 3 is a plot depicting the light output produced by electroluminescent diodes embodying the present invention.

The device of the type shown is fabricated and operated in accordance with the principles of the present invention to provide a light output in the visible portion of the spectrum when a sufficiently large voltage is applied across electrodes 20 and 22. More specifically, as is indicated in FIG. 3, this light output includes both green components having wavelengths in the vicinity of 5400 A. and yellow components having wavelengths in the vicinity of 5700 A. As is also indicated in the figure, the green output is of a higher intensity than the yellow.

Zinc telluride is a II–VI compound. As is characteristic of compounds of this class, conventional doping processes cannot be used to produce a p-n junction in this material. This is due to a self-compensating mechanism which appears to be inherent in the material that prevents the establishing of n type regions in the material. The semiconductor body used in the device 12 of FIG. 1 is cleaved from a semiconductor crystal substrate of zinc telluride which is initially grown doped with lithium so that the crystal is p type. Aluminium, which is an n type or donor impurity, is then diffused through one surface of the substrate in a sufficient quantity to compensate a thin layer of the material adjacent this surface and render it insulating. The substrate is then cleaved to form the smaller bodies and electrodes, such as are shown at 20 and 22 in FIG. 1, are attached.

The light output is produced as the result of an avalanche breakdown. More specifically when the voltage is applied across electrodes 20 and 22, a higher electric field is in the high resistivity insulating region 18 than in the p type region 16 which, of course, has much lower resistivity. The intrinsic region 18, of course, includes a very high population of donor and acceptor impurities which compensate each other to provide this region with its high resistivity characteristics. However, when an electron is injected from the metal electrode 20 which is connected to the negative terminal of the voltage supply 10 or a hole injected from the p type region 16 into the intrinsic region 18, the high field accelerates the injected charge carrier producing impact ionization and release of a hole-electron pair in the insulating region. These holes and electrons produce further ionization in the presence of the high electric field and this process is repeated causing avalanching to occur. This avalanching produces a large number of electrons in the conduction band and conversely a large number of holes in the valence band. Observation of the device reveals that as the voltage is increased a yellow output is first observed in the insulating region 18 indicating recombination in that region and at a somewhat higher current levels a green output is observed in the p type region 16. This latter output is provided by electrons which are swept out of the intrinsic region by the applied forward bias voltage to the highly doped p region where they recombine to produce the green emission. The avalanching process can be actually aided or even initiated by absorption of light emitted as the result of recombination in the insulating region. It is this process which gives rise to the negative resistance characteristic which is exhibited by the device. This characteristic allows triggering of the device between on and off states by either light or voltage pulses. Thus, the voltage source 10 may be designed to supply a voltage which is below that which is necessary to initiate avalanche breakdown but above that which is necessary to sustain avalanching once it is initiated. The voltage is then momentarily increased to apply a triggering pulse to initiate avalanching which is sustained after the triggering pulse is terminated.

Though, as described above, the theoretical basis for the operation of the device is believed to be an avalanche breakdown type mechanism, it is possible that other mechanisms are involved. However, the device operates, from an external view point, as if avalanche breakdown was being produced in the device. For this reason, the device is described in terms of an avalanching mechanism as the most probable explanation for the device behavoir, although it should be understood that in the actual operation of the device all that is necessary for the production of light output is the application of an applied voltage which exceeds a predetermined threshold. Once the light emission has been triggered by such a voltage pulse, it can be sustained with a much lower applied voltage across the device. The sustained light emission can be also triggered with light pulses used instead of voltage pulses.

Devices of the type shown in FIG. 1 have been operated both at 77° Kelvin and at room temperature, and individual devices have been fabricated which operate throughout the temperature range. However, it is preferred that the manner in which the device is fabricated be varied according to the temperature at which it is to be operated. This is due to the fact that the resistivity of the insulating region 18 varies with the temperature. An insulating region which has a resistivity at room temperature such that avalanching can be produced with a reasonable applied voltage requires an extremely high voltage to produce avalanching at 77° Kelvin. Conversely, an insulating region in which avalanching can be produced at a reasonable voltage at 77°, is of such low resistivity at room temperature that it is essentially conductive. The details of the method of preparing devices specifically for operation at different temperatures are disclosed later in this specification with attention being devoted now to an analysis in more detail of the impurity concentrations and mechanisms involved in producing the light output in and adjacent to the insulating region of the device.

Figure 4:
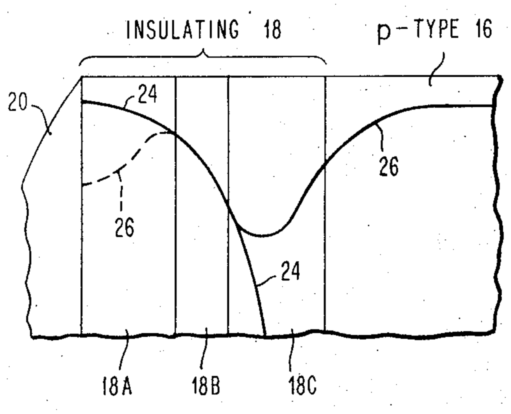
FIGS. 4 and 5 are schematic representations showing in more detail the characteristics of the insulating regions in different diodes constructed in accordance with the principles of the present invention.

FIG. 4 is an enlarged view illustrating schematically the material and light emitting characteristics of the device 12 of FIG. 1 in the insulating region 18 of the device and the adjoining portion of the p region 16. The insulating region 18 is divided into three portions 18A, 18B and 18C. Two curves 24 and 26 are drawn through these portions to illustrate respectively the concentration of the impurities Al and Li. These curves are not to scale but illustrate relative impurity concentration. The aluminium impurity concentration 24 is highest in portion 18A which is adjacent the surface through which this impurity is diffused. The lithium impurity concentration 26 is equal to the aluminium concentration in portion 18B, and decreases rather sharply in portion 18C before rising to an essentially constant value in region 16. Though the portion 18C is considered here to be part of the insulating region 18, this portion actually has a graded resistivity. As is indicated by the impurity concentration profiles, the section of portion 18C adjacent portion 18B has a much higher resistivity than the section adjacent region 16. Though the concentration of the lithium is shown to decrease in portion 18A, the concentration may actually be more nearly equal to the Al concentration and for this reason this segment of curve 26 is shown dotted. Prior to the diffusion of the aluminium, the lithium concentration is essentially constant throughout the zinc telluride crystal. The profile depicted by curve 26 results from diffusion of the lithium during the aluminium diffusion. Further, the profile and the characteristic of the different regions depends upon the method of preparation which will be considered in detail below.

For the present it suffices to state that diodes can be prepared for operation either at room temperature or liquid nitrogen temperature which produce outputs in the green and yellow (FIG. 3) and have characteristics of the type illustrated in FIG. 4. The actual light emitting characteristics of these portions of the insulating region 18 and adjoining portion of p region 16 have been studied using ultra violet stimulated photoluminescence at 77° K. In this procedure the material is stimulated with ultra violet light rather than by electrical signals applied across the device to stimulate the luminescent output. The light output realized for this type of operation is in the green in the region 16 adjacent the junction, is in the yellow in the portion 18B of region 18, and an orange output (about 6000 A) is emitted from the portion 18A next to the surface through which the Al diffusion takes place and which therefore has the highest aluminium concentration. No light output is observed in portion 18C of region 18.

It should be again emphasized at this time that curves 24 and 26 do not represent absolute but relative concentrations of impurities in the various portions of each region, and these curves are based on theoretical considerations as well as actual experimental results. Further each of these portions 18A, 18B and 18C is extremely small. The outer portions 18A and 18C have a width of about 10 to 20 microns and the middle portion 18B has a width of about 3 microns. However, the entire region 18 is insulating and does not include a p-n junction and the avalanching type mechanism is employed to produce an electroluminescent output.

The lack of light output from the portion 18C is believed to cut down on the efficiency of the device of FIG. 1 and though green and yellow outputs of the type shown in FIG. 3 have been observed in lithium and aluminium doped devices operated both at room temperature and liquid nitrogen temperature, the efficiency of the devices can be improved by carefully preparing the device to avoid the "dead" region 18C. This is accomplished by using as a substrate a zinc telluride crystal wafer which is doped with not only lithium but also phosphorus which is also a shallow acceptor (p type) impurity in zinc telluride. This impurity is less mobile during the subsequent aluminium diffusion step so that the concentration of holes is maintained relatively high in portion 18C. As a result the losses produced in this region with a wafer doped only with lithium are either minimized or avoided entirely. It should again be noted the portion 18C is a graded resistivity region which is less resistive than portions 18A and 18B.

At this point it should be pointed out the particular impurities used in the preparation of the device are significant. Lithium is a shallow level acceptor in zinc telluride and aluminium is believed to be a shallow level donor though, since n type zinc telluride cannot be obtained due to the self-compensating mechanism in this material, this belief has not been experimentally verified. However, the light outputs which are influenced by this impurity, especially that produced by recombination in region 18 are in the same general portion of the spectrum as the green outputs derived from the adjoining p type region where the lithium impurity predominates. Further, lithium diffuses in zinc telluride at a faster rate than aluminium and is more soluble in zinc telluride into which the aluminium is diffused. The lithium therefore diffuses within the material rather quickly to the region into which the aluminium is being diffused whereas the aluminium diffusion proceeds more slowly thereby allowing the narrow intrinsic region having insulating properties to be established at the surface of the semiconductor device. Phosphorus is also a shallow level donor impurity which diffuses much more slowly in zinc telluride and when present in the original crystal substrate tends to maintain a relatively high hole concentration in portion 18C of the insulating region so that recombination can take place in this region to produce a light output in the same general range of the visible spectrum.

The invention may also be produced with other semiconductor materials having characteristics similar to that of zinc telluride. Zinc selenide which is another II–VI compound and has a band gap in the visible range is a notable example of another such material. This material can be prepared to be n type but cannot easily be prepared to be p type. The choice of impurities for this or other materials of this type should be such as to allow the production of a relatively narrow insulating region, and the inventive principles may be employed to produce devices which differ from the preferred embodiments disclosed in that the insulating region is not adjacent to one of the surfaces of the body.

Figure 2:
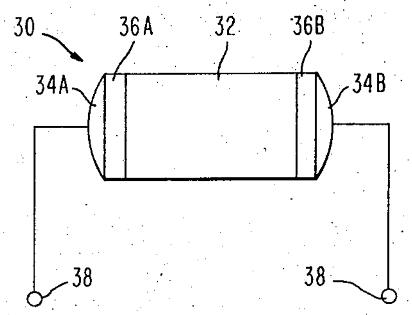

The device 12 of FIG. 1 is, of course, single ended and therefore operates to produce an electroluminescent output for one polarity of applied voltage which forward biases regions 16 and 18. A double ended device 30 is shown in FIG. 2 which includes an M-I-P structure at both ends. A central region 32 forms the p region for both structures, and electrodes 34A and 334B and insulating regions 36A and 36B complete the structures at either end of the device. In this device the polarity of the input voltage determines which of the M-I-P structures is caused to emit the electroluminescent output.

*Method of preparation*

The starting substrate for the devices doped with lithium and aluminium is a zinc telluride crystal substrate doped with lithium to a room temperature concentration of about $3\times10^{17}$ holes per cm.$^3$ The substrate is polished into a flat disc about 0.5 millimeters thick. A layer of aluminium is then vacuum deposited on one surface of the semiconductor substrate, the layer typically containing about 0.4 milligrams per cm.$^2$ The substrate with the aluminium coating is then placed in a quartz ampoule and the ampoule is evaporated. Though devices have been successfully prepared without any other material in the ampoule, the devices whose characteristics are discussed above were prepared with zinc being added to the ampoule. The evacuated ampoule which includes the substrate and zinc is placed in a furnace for firing to diffuse the aluminium into the semiconductor body. During the firing the presence of the zinc produces an environment with a zinc overpressure which minimizes loss of zinc telluride by evaporation.

The firing step is a critical one since the time, temperature and overpressure of the firing are prime factors which control the characteristics of the resulting intrinsic insulating region necessary for avalanching and, therefore, the sustaining voltage which must be applied to produce avalanching at any particular temperature. For example, to produce a device which provides an output as indicated in FIG. 3 when operated with a sustaining voltage of between 10 and 20 volts, the substrate is fired at 850° C. for five minutes.

After the substrate is fired, the material is rapidly quenched by immersing the ampoule in a water bath. Individual devices or diodes may be fabricated from the thus prepared substrate in one of three ways. The first and preferred method is lap off the surface on which the aluminium was originally deposited, cleave individual semiconductor wafers from the substrate and attach electrodes to the opposite surfaces with electroless gold or silver epoxy. The second method is to apply the electrodes to individual semiconductor wafers cleaved from the substrate after the lapping of the surface of the substrate opposite to the one on which the aluminium was placed. The third method is to apply the electrodes to cleaved wafers without any prior lapping operations. The preferred first method has been found to produce consistently better electroluminescent diodes.

In order to provide a diode which can be avalanced by reasonable applied voltages at room temperature where resistivity values are lower than at 77° K., a different firing procedure is required. For example, to provide diodes wich emit yellow and green outputs at room temperature at a sustaining voltage of 30 volts, the diffusion of aluminium and lithium is carried out by firing at a temperature of 850° C. for a time of three hours under zinc overpressure. These diodes require a higher sustaining voltage, of the order of a few hundred volts to produce avalanching at liquid nitrogen temperatures.

Figure 5:
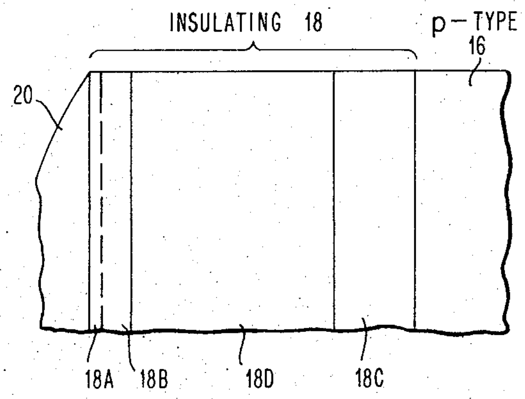

The firing procedure can also be controlled to produce diodes which have somewhat different light emitting characteristics. By controlling the firing temperature to be 1100° C. for a period of five minutes with zinc overpressure, diodes having characteristics of the type shown in FIG. 5 have been produced. This figure is similar to FIG. 4 and shows the intrinic region 18 broken down into four portions here designated 18A, 18B, 18C and 18D. Portions 18A, 18B and 18C are similar to like designated portions in FIG. 4 and the portion 18D of this structure is not found in the structure produced by the other firing procedure. Ultraviolet stimulation of this device produces an orange output in portion 18D, a green output from the portion of p region 16 adjacent the junction with the insulating region 18, and a yellow-orange output from portions 18A and 18B. When operated electrically the device having the characteristic shown in FIG. 5 emits an output which appears to be completely orange indicating that the recombination takes place primarily in the insulating region of the material.

Though the diffusion processes described above are at present the preferred methods of preparing improved devices of the type to which this application is directed, it is of course understood that other processes, such as epitaxial growth and solution regrowth may be used to produce devices which embody the principles of the present invention.

While the invention has been particularly shown and described with reference to preferred embodiments thereof, it will be understood by those skilled in the art that various changes in form and details may be made therein without departing from the spirit and scope of the invention.

What is claimed is:

1. A semiconductor device comprising:

(a) a body of semiconductor material;

(b) said body including a first region doped with a first impurity of a first conductivity type to render said first region first conductivity type;

(c) said body including a second region doped with said first impurity and a second impurity of opposite conductivity type which compensates said first impurity;

(d) said second region extending in said body from said first region to a first surface of said body;

(e) said second region having a thickness greater than the distance which carriers can tunnel through said region;

(f) said second region including first and second portions, both of which are insulating, with said first portion extending to said first surface and said second portion being electroluminescent and being separated from said first surface by said first portion;

(g) a first electrode connected to said first surface of said body;

(h) a second electrode connected to another surface of said body separated from said first surface by said first and second regions in said body;

(i) and means including means coupled to said electrodes for applying a forward biasing voltage across said first and second regions to produce electroluminescence in said body.

2. The semiconductor diode of claim 1 wherein at least a portion of said second region is photoconductively responsive to said electroluminescent radiation produced in said body whereby the voltage necessary to sustain said electroluminescence is appreciably less than the threshold voltage required to initiate the electroluminescence.

3. The diode of claim 2 wherein said semiconductor material is a material of the type which can be doped with an impurity of said first conductivity type to render the body first conductivity type, but which is not rendered second conductivity type by doping with said impurity of opposite conductivity type.

4. The diode of claim 1 wherein said semiconductor material is a II–VI compound.

5. The diode of claim 1 wherein said semiconductor material is zinc telluride.

6. The diode of claim 5 wherein said first impurity is lithium and said second impurity is aluminium.

7. The diode of claim 1 wherein said body also includes a third impurity of said first conductivity type.

8. The diode of claim 7 wherein said semiconductor material is zinc telluride, said first impurity is lithium, said second impurity is aluminium and said third impurity is phosphorus.

9. An electroluminescent device which provides a light output in the visible portion of the electromagnetic spectrum comprising:

(a) a body of zinc telluride;

(b) said body including a first region doped with lithium to render said first region p type;

(c) said body including a second region doped with lithium and aluminium;

(d) said second region having a thickness greater than the distance which carriers can tunnel through said region;

(e) said second region including first and second portions with said first portion extending to a first surface of said device, and said second portion being located between said first portion and said first region and being separated from said first surface by said first portion of said second region;

(f) said first and second portions being insulating but exhibiting different characteristics with said second portion being electroluminescent;

(g) and means for applying a voltage across said first and second regions above a threshold voltage necessary to produce a sustained light emission from said device.

10. An electroluminescent device providing a light output in the visible portion of the electromagnetic spectrum comprising:

(a) a body of semiconductor material of the type which can be doped to render the material first conductivity type but which cannot be rendered second conductivity type;

(b) said body including a first region doped with a first impurity of a first conductivity type to render said first region first conductivity type;

(c) said body including a second region doped with said first impurity and a second impurity of a second opposite conductivity type which compensates said first impurity;

(d) said second region extending in said body from said first region to a first surface of said body;

(e) said second region having a thickness greater than the distance which carriers can tunnel through said region;

(f) said second region including first and second and third portions with said first portion extending to a first surface of said device, said second portion being separated from said first surface by said first portion;

(g) said second impurity imparting to at least a portion of said second region the property of producing a light output when a voltage above a threshold voltage is applied across the device and also imparting to at least a portion of said second region the property of responding photoconductively to said light output;

(h) and means for applying a voltage across said first and second regions to produce a sustained light output from said devices.

11. The electroluminescent device of claim 10 wherein said second impurity imparts said property of producing a light output to said second portion of said second region.

References Cited

UNITED STATES PATENTS

| | | | |
|---|---|---|---|
| 2,908,871 | 10/1959 | Mckay | 317—234 |
| 3,016,313 | 1/1962 | Pell | 317—235 |
| 3,212,940 | 10/1965 | Blankenship | 148—1.5 |
| 3,267,294 | 8/1966 | Dumke et al. | 317—235 |

OTHER REFERENCES

Eastman et al., "Injection Electroluminescence in Metal-Semiconductor Tunnel Diodes," Solid-State Electronics, Pergamon Press, 1964, vol. 7, pp. 879–885.

Fischer, "Comparative Study of Injection Electroluminescence Effects in N-Type ZnSe Crystals," AFCRL–64–858, AD 608491 Clearinghouse, 1964, pp. 13–22.

JAMES W. LAWRENCE, *Primary Examiner.*

R. L. JUDD, *Assistant Examiner.*